(12) United States Patent
Vinapamula Venkata et al.

(10) Patent No.: US 8,806,033 B1
(45) Date of Patent: Aug. 12, 2014

(54) EFFECTIVE NETWORK IDENTITY PAIRING

(75) Inventors: Suresh Kumar Vinapamula Venkata, Sunnyvale, CA (US); Rajesh Mohan, Cupertino, CA (US); Sarat Kamisetty, Fremont, CA (US); Reinaldo Penno, San Jose, CA (US); Sanjay V. Agrawal, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 125 days.

(21) Appl. No.: 13/174,457

(22) Filed: Jun. 30, 2011

(51) Int. Cl.
*G06F 15/16* (2006.01)
(52) U.S. Cl.
USPC .......................... 709/228; 709/245; 709/246
(58) Field of Classification Search
USPC .................... 709/227, 228, 245, 246, 249
See application file for complete search history.

(56) References Cited

U.S. PATENT DOCUMENTS

| | | | |
|---|---|---|---|
| 6,967,954 B2 * | 11/2005 | Sugiyama | 370/395.52 |
| 7,533,164 B2 * | 5/2009 | Volz et al. | 709/223 |
| 7,620,033 B2 * | 11/2009 | Chu et al. | 370/352 |
| 7,952,995 B2 * | 5/2011 | Sung | 370/229 |
| 8,112,545 B1 * | 2/2012 | Ong | 709/238 |
| 2003/0093563 A1 * | 5/2003 | Young et al. | 709/245 |
| 2005/0050211 A1 * | 3/2005 | Kaul et al. | 709/229 |
| 2005/0055454 A1 * | 3/2005 | Welck et al. | 709/231 |
| 2006/0239257 A1 * | 10/2006 | Banner et al. | 370/356 |
| 2007/0147421 A1 * | 6/2007 | Kim | 370/466 |
| 2010/0175123 A1 | 7/2010 | Karino et al. | |
| 2013/0227170 A1 * | 8/2013 | Zha et al. | 709/245 |

* cited by examiner

*Primary Examiner* — Lance L Barry
(74) *Attorney, Agent, or Firm* — Harrity & Harrity, LLP

(57) ABSTRACT

A network device may receive a request from a local device to establish a connection with a another device. The request may include an internal network identifier of the local device. The network device may evaluate a plurality of external network identifiers, associated with the network device based on selected criteria. The network device may also, or alternatively, evaluate the external network identifiers by identifying an external network identifier that is already mapped to, or paired with, the internal network identifier. The network device may select an external network identifier, of the plurality of external network identifiers, based on the evaluation and establish the connection requested by the local device using the internal network identifier and the external network identifier.

19 Claims, 11 Drawing Sheets

EFFECTIVE NETWORK IDENTITY PAIRING

BACKGROUND

Currently available network technologies include a variety of different networks, such as local area networks (LANs), wide area networks (WANs), and wireless networks. In some instances, a user device may communicate with devices in another network by communicating via a router, a switch, or another type of network device. The network device may associate an identifier (ID), such as an Internet Protocol (IP) address, of the user device with an ID of the network device. For outbound communications from the user device, the network device may replace the ID of the user device with an ID of the network device. By contrast, for inbound communications to the user device, the network device may replace an ID of the network device for an ID of the user device. However, currently available solutions for associating user device IDs and network device IDs often result in an inefficient use of network resources.

SUMMARY

In one aspect, a network device may include a memory to store instructions; and a processor, connected to the memory, to: receive a request from a local device to establish a connection with another device, the request including an internal network identifier of the local device; evaluate a plurality of external network identifiers, associated with the network device, based on a selected criteria; select an external network identifier, of the plurality of external network identifiers, based on the evaluation; and establish the connection requested by the local device using the internal network identifier and the external network identifier.

In another aspect, a non-transitory computer-readable medium may store a program for causing a device to perform a method. The method may include receiving a first request from a first device to establish a connection with a second device, the first request including an internal network identifier of the first device; selecting a first external network identifier, of a plurality of external network identifiers, to maximize a quantity of potential connections available to the first device; establishing a connection between the internal network identifier of the first device and the second device using the first internal network identifier and first external network identifier; monitoring the connection between the first device and the second device for potential connection availability information; receiving a second request from a third device to establish a connection with a fourth device, the second request including an internal network identifier of the third device; selecting, based on the potential connection availability information corresponding to the connection between the first device and the second device, a second external network identifier to maximize a quantity of potential connections available to the third device; and establishing a connection between the third device and the fourth device using the internal network identifier of the third device and the second external network identifier.

In yet another aspect, a method may include receiving, by a network device, a request from a first device to establish a connection with a second device, the request including a network identifier of the first device; evaluating, by the network device, external network identifiers based on a selected criteria; selecting, by the network device, an external network identifier, of a plurality of external network identifiers, based on the evaluation; pairing, by the network device, the internal network identifier with the external network identifier; and establishing, by the network device, the requested connection using the internal network identifier and the external network identifier.

DETAILED DESCRIPTION

The following detailed description refers to the accompanying drawings. The same labels and/or reference numbers in different drawings may identify the same or similar elements.

In one or more implementations, described herein, a network device may be used to pair internal network identifiers (IDs) (e.g., LAN-side IP addresses) with external network IDs (e.g., WAN-side IP addresses) to effectively use network device resources. For example, a network device may receive a request from a local device to communicate with another device. The network device may respond by selecting an external network ID to pair with the internal network ID of the request, which may be based on one or more conditions or criteria. Examples of such conditions or criteria may include implementing a turn-based criterion for selecting the external network ID, determining a quantity of available resources (e.g., ports) for each external network ID, identifying a quantity of internal network IDs already associated with each external network ID, or other types of conditions or criteria relating to pairing internal network IDs to external network IDs. The network device may establish the requested connection using the external network ID paired to the internal network ID.

Figure 1:
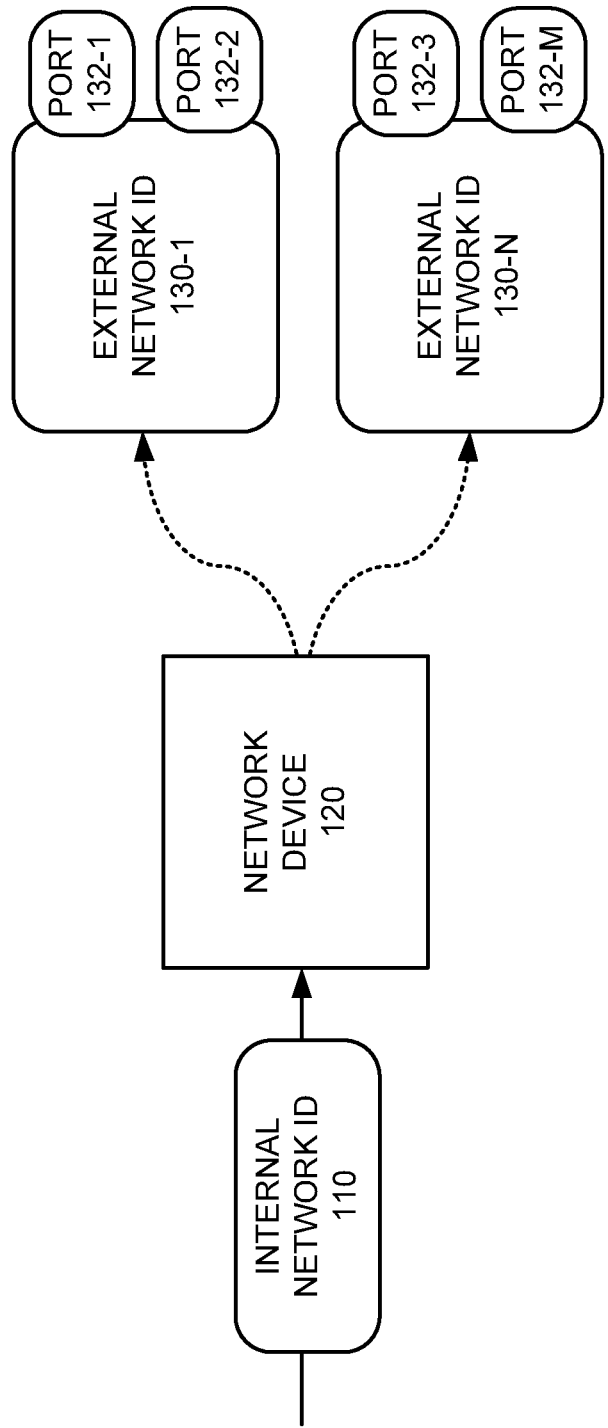
FIG. 1 is a diagram of an overview of an implementation described herein.

FIG. 1 is a diagram of an overview 100 of an implementation described herein. As depicted, overview 100 may include an internal network ID 110, a network device 120, external network IDs 130-1, . . . , 130-N (where N≥1) (collectively referred to as "external network IDs 130," and individually as "external network ID 130"), and ports 132-1, 132-2, 132-3, . . . , 132-M (where M≥1) (collectively referred to as "ports 132," and individually as "port 132"). In some implementations, one or more of the devices, processes, or data structures of FIG. 1 may correspond to one or more devices, processes, or data structures discussed elsewhere in this specification.

Internal network ID 110 may include one or more of a variety of data structures. For example, internal network ID 110 may include a data structure capable of identifying an object, device, or other entity within a network, such as a user device (not shown). In some implementations, internal network ID 110 may be an ID corresponding to one or more network or communication protocols, such as an IP address.

Network device 120 may include one or more of a variety of network devices. For example, network device 120 may include a gateway, a router, a switch, a hub, a network address translation (NAT) box, a NAT device, or another type of network device. As depicted, network device 120 may be capable of receiving internal network ID 110 and associating, mapping, or otherwise pairing internal network ID 110 with one or more external network IDs 130. As described below, network device 120 may pair internal network ID 110 with one or more external network IDs 130 based on one or more conditions or criteria, such as a turn-based pairing solution, a quantity of available ports 132, or other types of resources, corresponding to each external network ID 130, a quantity of internal network IDs 110 paired with each external network ID 130, an expected connection longevity associated with each external network ID 130, and other types of conditions or criteria.

Similar to internal network ID 110, external network IDs 130 may include one or more of a variety of data structures. For example, external network ID 130 may include a data structure capable of identifying an object, device, or other entity within a network, such as network device 120. In some implementations, external network ID 130 may be an ID corresponding to one or more network or communication protocols, such as an IP address. Additionally, or alternatively, external network IDs 130 may be associated with one or more ports 132.

Port 132 may include one or more of a variety of data structures relating to network communications. For example, port 132 may include a data structure identifying a connection or communication endpoint. In some implementations, port 132 may be a data structure that is formatted in accordance with one or more communication protocols, such as Internet Protocol (e.g., IPv4, IPv6, etc.), Transmission Control Protocol (TCP), and/or User Datagram Protocol (UDP).

Figure 2:
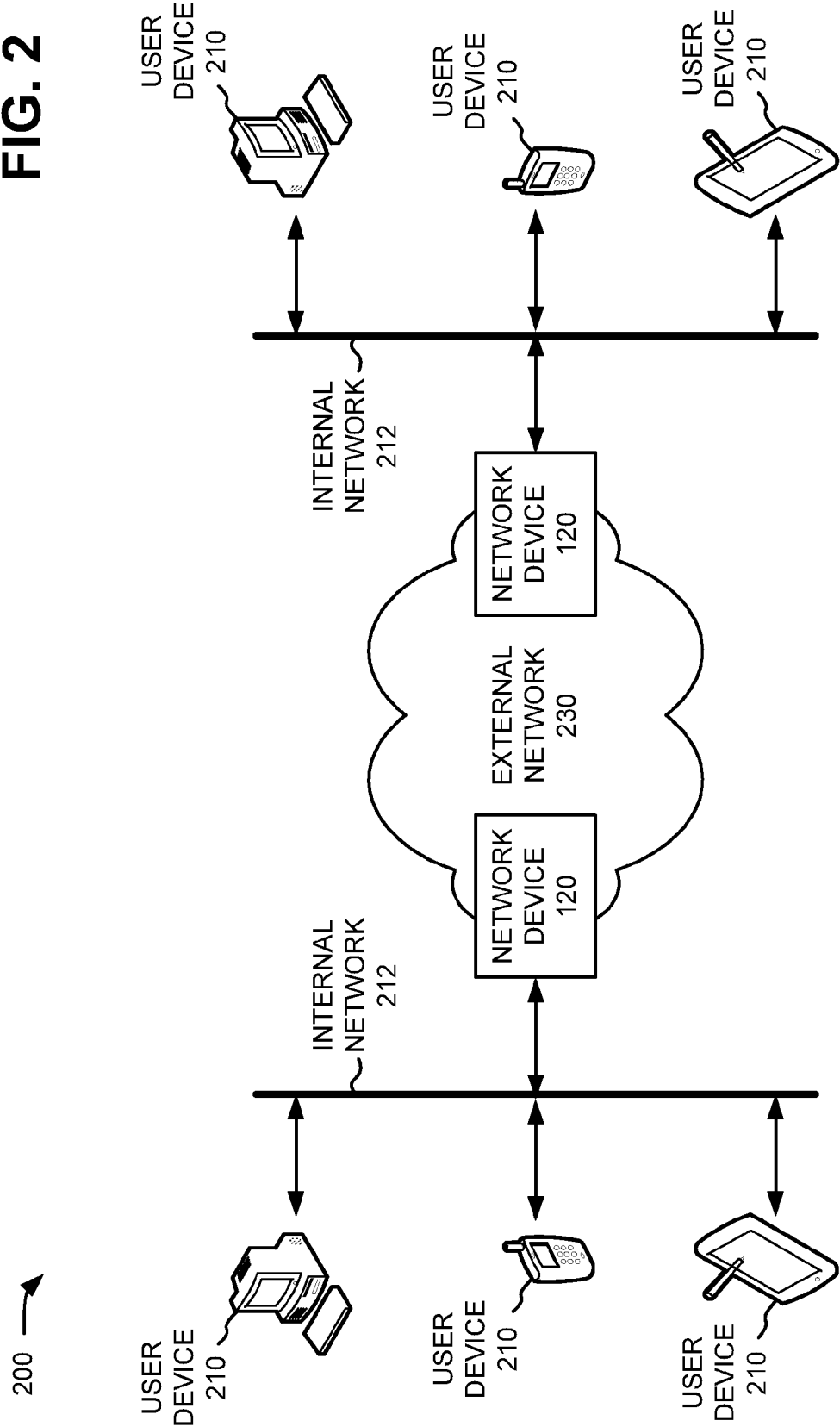
FIG. 2 is a diagram that illustrates an example environment in which systems and/or methods, described herein, may be implemented.

FIG. 2 is a diagram that illustrates an example environment 200 in which systems and/or methods, described herein, may be implemented. As depicted, environment 200 may include user devices 210, internal networks 212, network devices 120, and external network 230. While FIG. 2 shows a particular quantity and arrangement of networks and devices, in alternative implementations, environment 200 may include additional networks or devices, fewer networks or devices, different networks or devices, or differently arranged networks or devices than those depicted. Similarly, the networks and devices illustrated in FIG. 2 may be capable of establishing and communicating via any quantity or combination of wired and/or wireless connections.

User devices 210 may include a variety of computing or communication devices, including smart phones, laptop computers, tablet computers, desktop computers, and/or other types of computing or communication devices. In some implementations, user devices 210 may be capable of communicating with one another. For example, in some implementations, user devices 210 may be capable of communicating with network device 120 and/or other user devices 210 via internal networks 212.

Internal networks 212 may include one or more of a variety of networks. For instance, internal network 212 may be implemented as a LAN, a wireless network, a virtual network (e.g., a virtual private network (VPN)), or another type of network. Internal networks 212 may also, or alternatively, include one or more network devices, such as routers, switches, hubs, and one or more other types of devices for enabling network communications. As depicted, internal networks 212 may enable user devices to communicate with network devices 120, which were described above with respect to FIG. 1.

Similar to internal networks 212, external network 230 may include one or more of a variety of networks. For example, external network 230 may include a LAN, a WAN (e.g., the Internet), one or more telecommunication networks, a metropolitan area network (MAN), an ad hoc network, or a fiber optic network. In some implementations, external network 230 may include a packet network. External network 230 may also, or alternatively, include a variety of network devices, including routers, switches, hubs, application servers, web servers, proxy servers, domain name system (DNS) servers, and/or other types of network devices.

Figure 3:
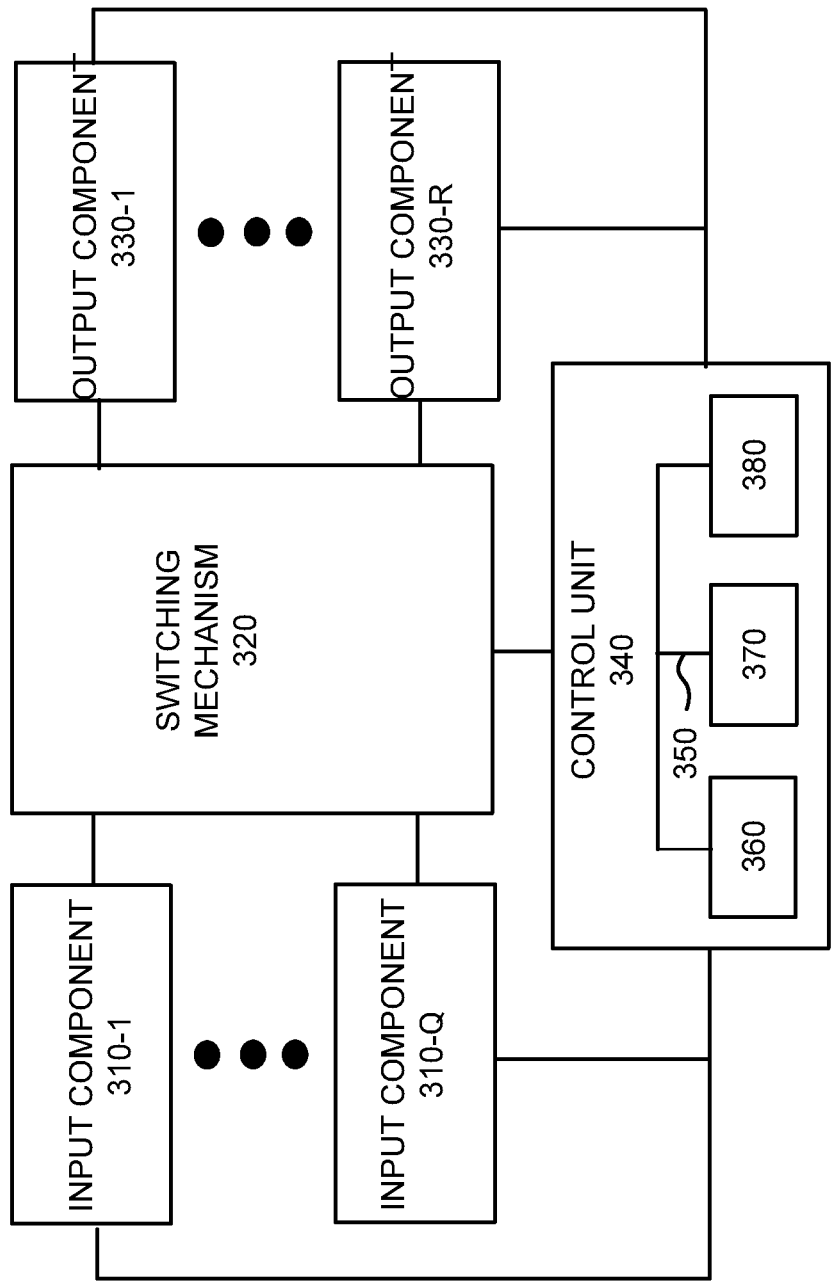
FIG. 3 is a diagram of example components of a network device of FIG. 2.

FIG. 3 is a diagram of example components of a network device 120 of FIGS. 1-2. Network device 120 may include input components 310-1, . . . , 310-Q (where Q≥1) (collectively referred to as "input components 310," and individually as "input component 310"), switching mechanism 320, output ports 330-1, . . . , 330-R (where R≥1) (collectively referred to as "output ports 330," and individually as "output port 330"), and control unit 340 (which may include bus 350, processor 360, memory 370, and communication interface 380). However, the precise components of network device 120 may vary between implementations. For example, depending on the implementation, network device 120 may include fewer components, additional components, different components, or differently arranged components than those illustrated in FIG. 3.

Input ports 310 may be points of attachment for physical links and may be the points of entry for incoming traffic. Input ports 310 may perform datalink layer encapsulation and decapsulation. Input ports 310 may look up a destination address of incoming traffic (e.g., any type or form of data, such as packet or non-packet data) in a forwarding table (e.g., a MAC table) to determine a destination port of the data (e.g., route lookup). In order to provide quality of service (QoS) guarantees, input ports 310 may classify traffic into predefined service classes. Input ports 310 may run datalink-level protocols and/or network-level protocols.

Switching mechanism 320 may include a switching fabric that provides links between input ports 310 and output ports 330. For example, switching mechanism 320 may include a group of switching devices that route traffic from input ports 310 to output ports 330.

Output ports 330 may store traffic and may schedule traffic on one or more output physical links. Output ports 330 may include scheduling algorithms that support priorities and guarantees. Output ports 330 may support datalink layer encapsulation and decapsulation, and/or a variety of higher-level protocols.

Control unit 340 may interconnect with input ports 310, switching mechanism 320, and output ports 330. Control unit 340 may perform control plane processing, including computing and updating forwarding tables, manipulating QoS tables, maintaining control protocols, etc. Control unit 340 may process any traffic whose destination address may not be found in the forwarding table.

In one embodiment, control unit 340 may include a bus 350 that may include one or more paths that permits communication among processor 360, memory 370, and communication interface 380. Processor 360 may include a microprocessor or processing logic (e.g., an application specific integrated circuit (ASIC), field programmable gate array (FPGA), etc.) that may interpret and execute instructions, programs, or data structures. Processor 360 may control operation of network device 120 and/or one or more of the components of network device 120.

Memory 370 may include a random access memory (RAM) or another type of dynamic storage device that may store information and/or instructions for execution by processor 360, a read only memory (ROM) or another type of static storage device that may store static information and/or instructions for use by processor 360, a flash memory (e.g., an electrically erasable programmable read only memory (EEPROM)) device for storing information and/or instructions, and/or some other type of magnetic or optical recording medium and its corresponding drive. Memory 370 may also store temporary variables or other intermediate information during execution of instructions by processor 360.

Communication interface 380 may include any transceiver-like mechanism that enables control unit 340 to communicate with other devices and/or systems. For example, communication interface 380 may include a modem or an Ethernet interface to a LAN. Additionally or alternatively, communication interface 380 may include mechanisms for communicating via a wireless network. Communication interface 380 may also include a console port that may allow a user to interact with control unit 340 via, for example, a command line interface. A user may configure network device 120 via a console port (not shown).

Network device 120 may perform certain operations, as described in detail below. Network device 120 may perform these operations in response to, for example, processor 360 executing software instructions (e.g., computer program(s)) contained in a computer-readable medium, such as memory 370, a secondary storage device (e.g., hard disk, CD-ROM, etc.), or other forms of RAM or ROM. A computer-readable medium may be defined as a non-transitory memory device. A memory device may include memory space within a single physical memory device or spread across multiple physical memory devices.

The software instructions may be read into memory 370 from another computer-readable medium, such as a data storage device, or from another device via communication interface 380. The software instructions contained in memory 370 may cause processor 360 to perform processes that will be described later. Alternatively, hardwired circuitry may be used in place of, or in combination with, software instructions to implement processes described herein. Thus, implementations described herein are not limited to any specific combination of hardware circuitry and software.

Figure 4:
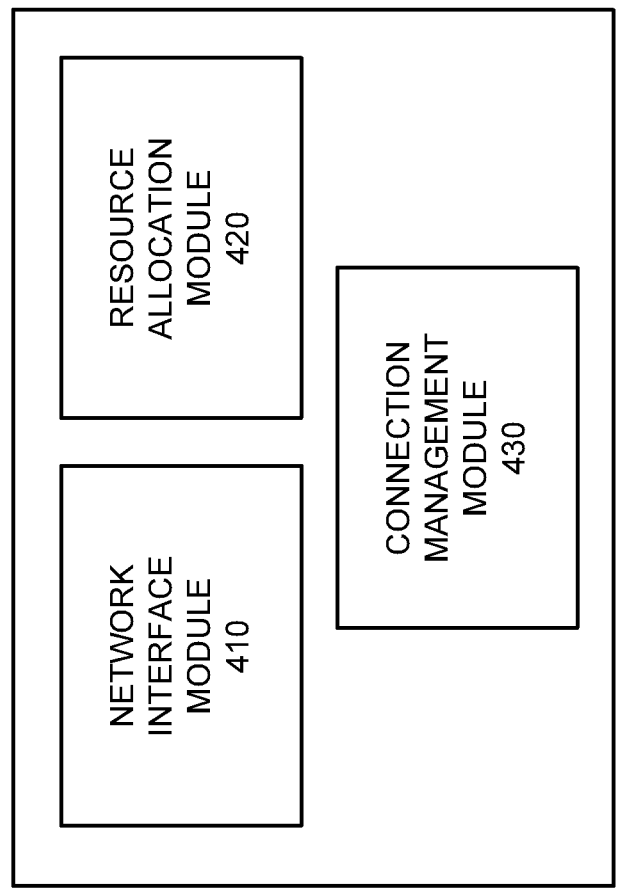
FIG. 4 is a diagram of example functional components of a network device of FIG. 2.

FIG. 4 is a diagram of example functional components of a network device 120 of FIGS. 1-3. As depicted, network device 120 may include network interface module 410, resource allocation module 420, and connection management module 430. Depending on the implementation, one or more of the modules 410-430 may be implemented as a combination of hardware and software based on the components illustrated and described with respect to FIG. 3. Alternatively, modules 410-430 may each be implemented as hardware based on the components illustrated and described with respect to FIG. 3. While FIG. 4 shows a particular quantity and arrangement of modules, in alternative implementations, network device 120 may include additional modules, fewer modules, different modules, or differently arranged modules than those depicted. A description of FIG. 4 is provided below with corresponding references to FIGS. 5-10.

Network interface module 410 may provide functionality with respect to communicating with other devices. For example, network interface module 410 may enable network device 120 to send and receive data and other information to locally connected devices (e.g., user devices 210) of internal network 212. Additionally, or alternatively, network interface module 410 may enable network device 120 to send and receive data and other information to devices of external network 230. In some implementations, network interface module 410 may receive a request from a locally connected user device 210 to communicate with or establish a connection with a device (e.g., another user device 210) outside of internal network 212. In such scenarios, network interface module 410 may identify an internal network ID associated with user device 210, and notify resource allocation module 420 of the request.

Resource allocation module 420 may provide functionality with respect to monitoring and managing resources of network device 120. For example, resource allocation module 420 may evaluate a current or expected allocation of external network IDs 130 and ports 132 in order to identify an external network ID 130 to map, associate with, or otherwise pair to an internal network ID 110 received from user device 210. Depending on the implementation, resource allocation module 420 may identify such an external network ID 130 according to one or more of a variety of conditions or criteria, examples of which are discussed below with respect to FIGS. 5-10. In some implementations, resource allocation module 420 may also, or alternatively, determine whether internal network ID 110 is already paired with one or more external network IDs 130, and, if so, select the external network ID 130 that is already paired with internal network 110 for establishing a connection.

FIGS. 5-10 are diagrams of example solutions (referred to individually using references numbers 500, 600, 700, 800, 900, and 1000, respectively) for pairing network IDs according to one or more implementations described herein. While FIGS. 5-10 each show a particular quantity and arrangement of data structures, in alternative implementations, identity pairing solutions may include additional data structures, fewer data structures, different data structures, or differently arranged data structures than those depicted.

Figure 5:
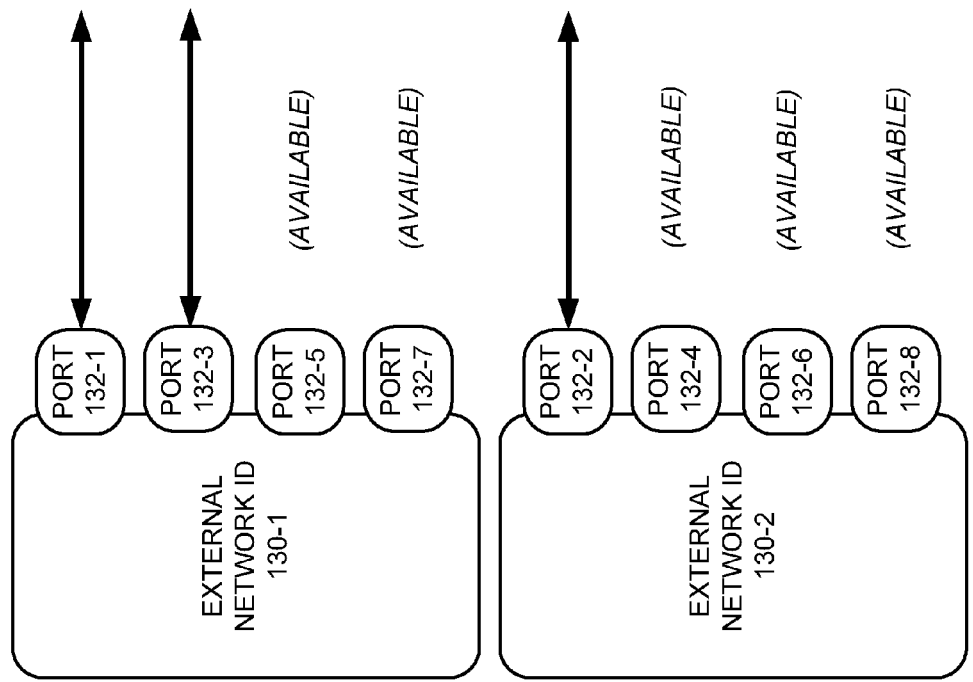
FIGS. 5-10 are diagrams of example solutions for pairing network identifiers (IDs) according to one or more implementations described herein.

Referring to FIG. 5, resource allocation module 420 may enable network device 120 to pair an internal network ID 110 (not shown) with an external network ID 130 based on a turn-based pairing solution. For example, network device 120 may pair the first internal network ID 110 received with external network ID 130-1 and the second internal network ID 110 received with external network ID 130-2. In implementations with additional external network IDs 130 (e.g., 130-3, 130-4, 130-5, etc.), the additional external network IDs 130 could each, in turn, be paired with an internal network ID 110. However, since the example depicted in FIG. 5 only includes two external network IDs 130, the third internal network ID received by network device 120 may be paired with network ID 130-1, as depicted.

Figure 6:
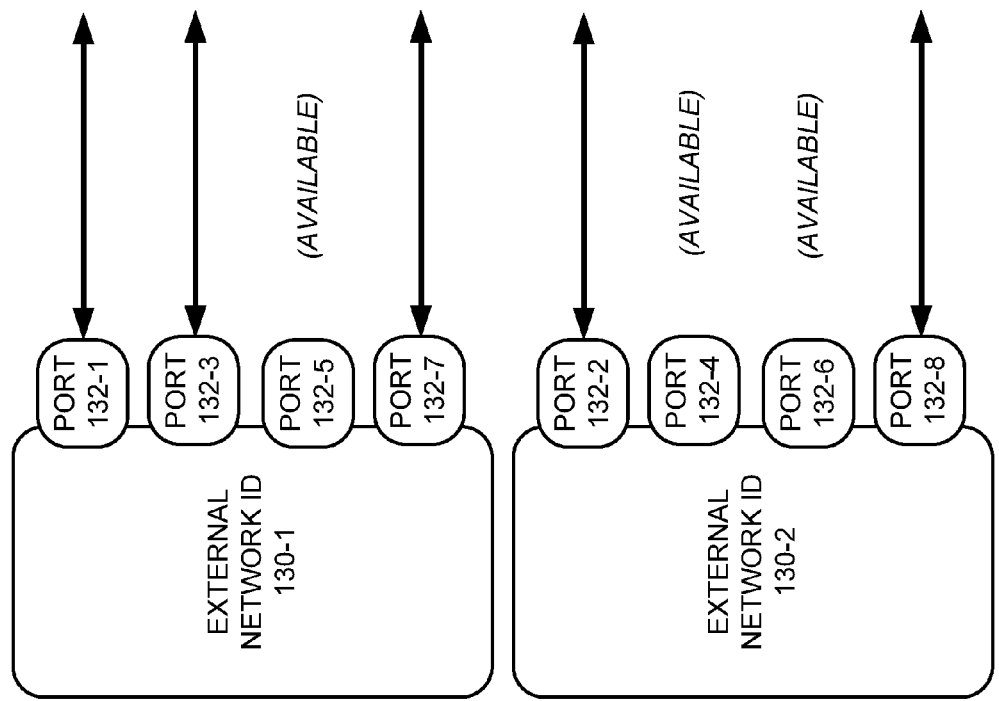

Referring to FIG. 6, resource allocation module 420 may enable network device 120 to pair an internal network ID 110 with an external network ID 130 based on a current quantity of available ports 132 corresponding to each external network ID 130. In the example of FIG. 6, three of the four ports 132 of external network ID 130-2 are involved in network connections (represented by bi-directional arrows extending from each corresponding port 132). By contrast, only two of the four ports 132 of external network ID 130-1 are involved in network connections. In such a scenario, network device 120 may pair the next internal network ID 110 with external network ID 130-2 since external network ID 130-2 has more available ports 132 than external network ID 130-1.

Resource allocation module 420 may operate in a similar manner in implementations that include more external network IDs 130 than FIG. 6. For example, in implementations that include ten external IDs 130 (instead of the two in FIG. 6), network device 120 may still pair internal IDs 110 with external IDs 130 based on which external ID 130 has the greatest quantity of available ports 132.

Figure 7:
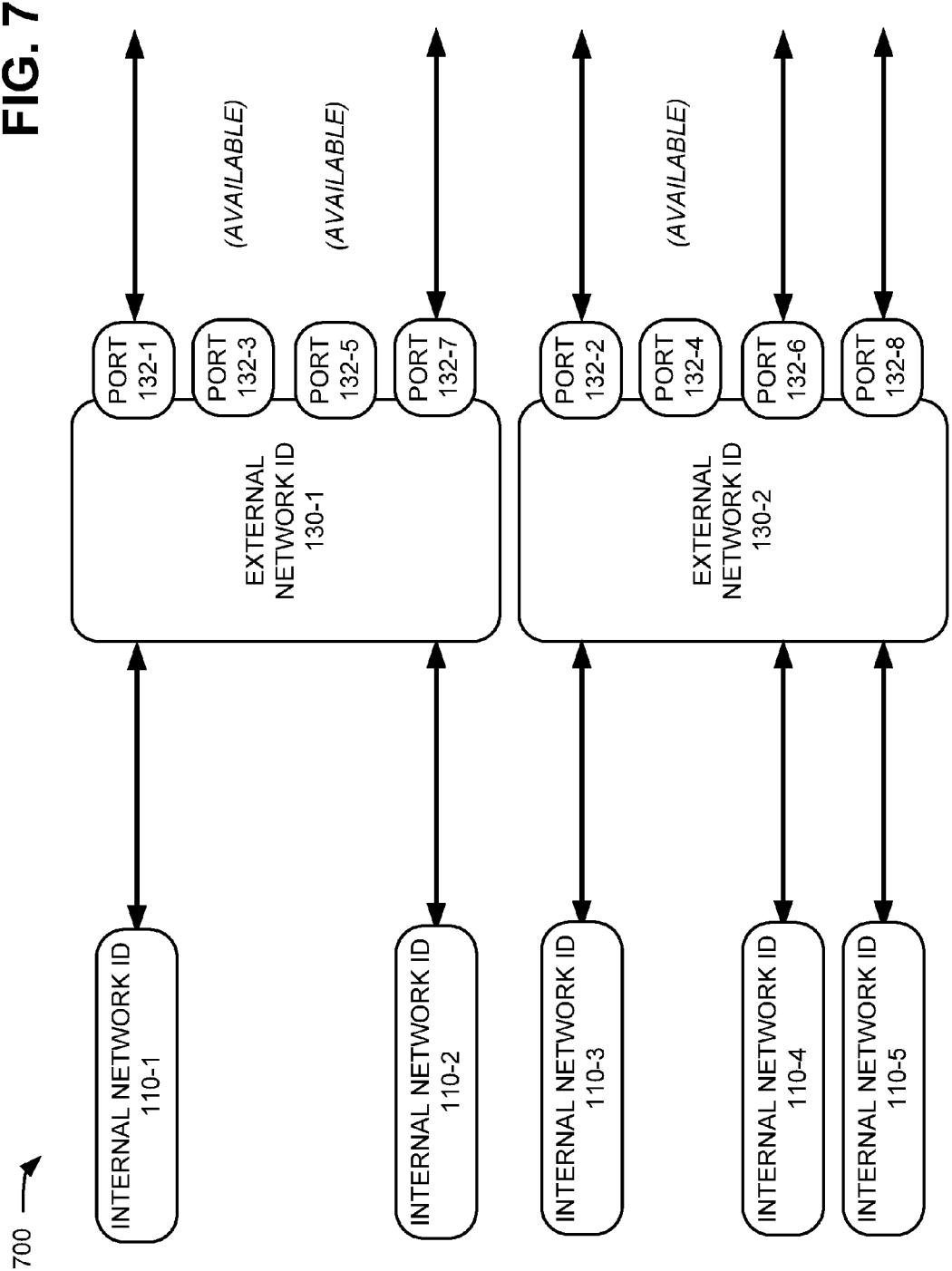

Referring to FIG. 7, resource allocation module 420 may enable network device 120 to pair an internal network ID 110 with an external network ID 130 based on a current quantity of internal network IDs 110 paired to each external network ID 130-1. In the example of FIG. 7, two internal network IDs (110-1 and 110-2) are paired to external network ID 130-1, and three internal network IDs 110 (110-3, 110-4, and 110-5) are paired to external network ID 130-2. Network device 120 may, therefore, pair the next internal network ID 110 with external network ID 130-1 because external network IDs is paired with only two internal network IDs.

Resource allocation module 420 may operate in a similar manner in implementations that include more external network IDs 130 than FIG. 7. For example, in implementations that include ten external IDs 130 (instead of the two in FIG. 7), network device 120 may still pair internal IDs 110 with external IDs 130 based on which external ID 130 is paired with the fewest internal network IDs 110.

Figure 8:
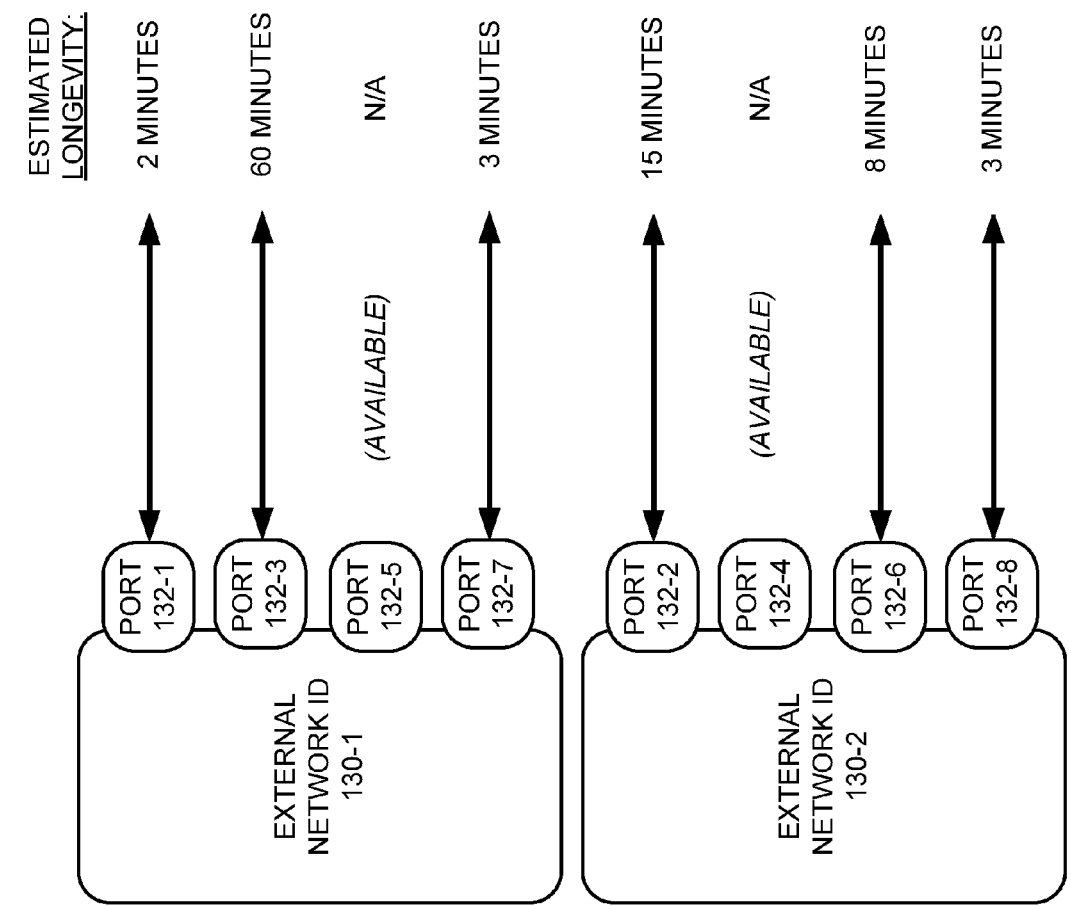

Referring to FIG. 8, resource allocation module 420 may enable network device 120 to pair an internal network ID 110 with an external network ID 130 based on an estimated connection longevity. For example, network device 120 may estimate a cumulative connection longevity for each external network ID 130 and pair the next internal network ID 110 to the external network ID 130 with the lowest cumulative connection longevity. In the depicted example, network device 120 may pair the next internal network ID 110 with external network ID 130-2 since the estimated cumulative connection longevity for external network ID 130-2 is lower (e.g., 26 minutes) than that of external network ID 130-1 (e.g., 65 minutes). In some implementations, a connection longevity may be estimated based on factors such as a destination port (not shown) and/or a protocol or information sent from user devices 210 to external network 230. In certain implementations, the internal network ID 110 may be paired based on other factors relating to an estimated connection longevity, such as an average estimated connection longevity.

Figure 9:
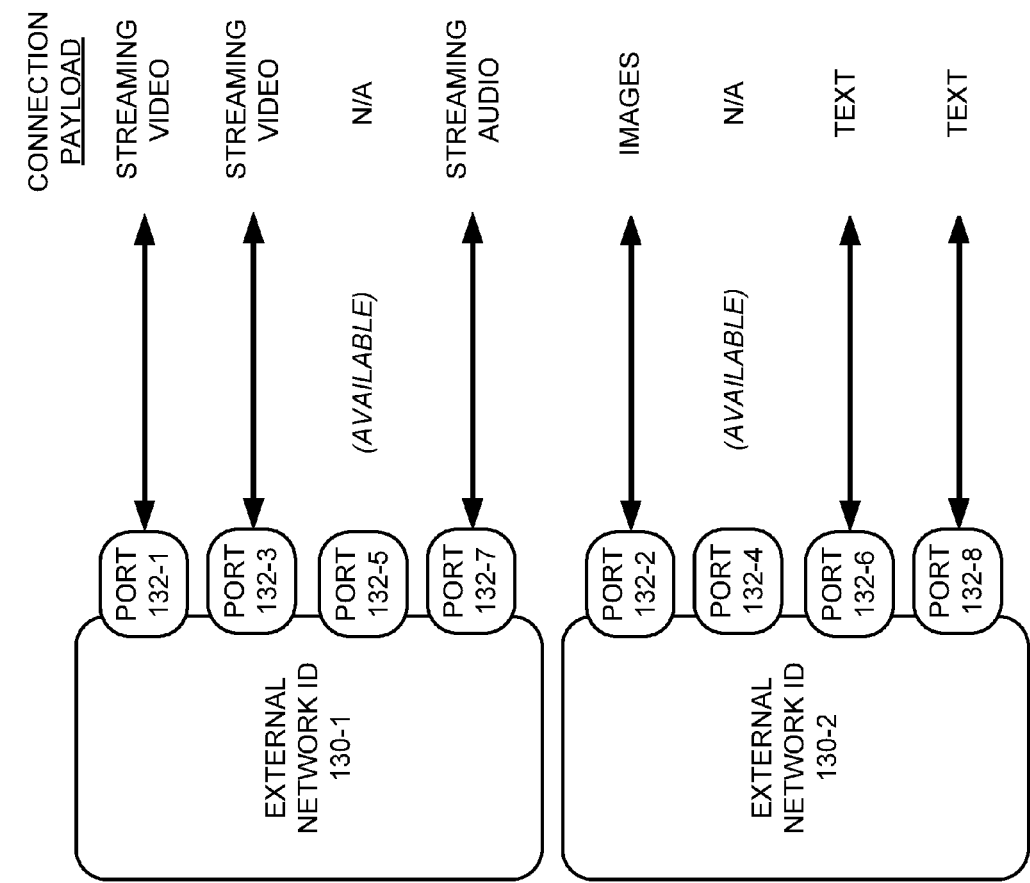

Referring to FIG. 9, resource allocation module 420 may enable network device 120 to pair an internal network ID 110 with an external network ID 130 based on connection payloads corresponding to each external network ID 130. As depicted in the example of FIG. 9, a connection payload may be estimated or otherwise evaluated based on the quantity of connections and the type of data being transferred over each connection. For example, since external network ID 130-1 includes two video streaming connections (port 132-1 and port 132-3) and an audio streaming connection (132-7), while external network ID 130-2 includes two connections transferring text (port 132-6 and port 132-8) and another connection transferring images (port 132-2), network device 120 may decide to pair the next internal network ID with external network ID 130-2.

In some implementations, resource allocation module 420 may implement a function for determining and comparing payloads of external network IDs 130. For example, an index may be established for rating connection payloads based on payload type. In some implementations, the index may be used to assign a numeric value to each payload type (e.g., streaming video=10, streaming audio=5, images=3, and text=1). In such implementations, the connection payload for a given external network ID 130 may be the sum of index values associated with each port of the external network ID 130. The sums of two or more external network IDs could be compared with one another to determine which external network ID 130 will be paired with the next internal network ID 110 (e.g., the external network ID with the lower connection payload).

In other implementations, a connection payload may be determined based on a bit rate associated with each port 132. For example, bit rates for a port may be monitored over a selected period of time and used to determine an overall average bit rate for a given external network ID 130, and the overall average bit rate for two or more external network IDs 130 may be compared to determine which external network ID 130 will be paired with the next internal network ID 110 (e.g., the external network ID with the lowest overall average bit rate connection payload).

Figure 10:
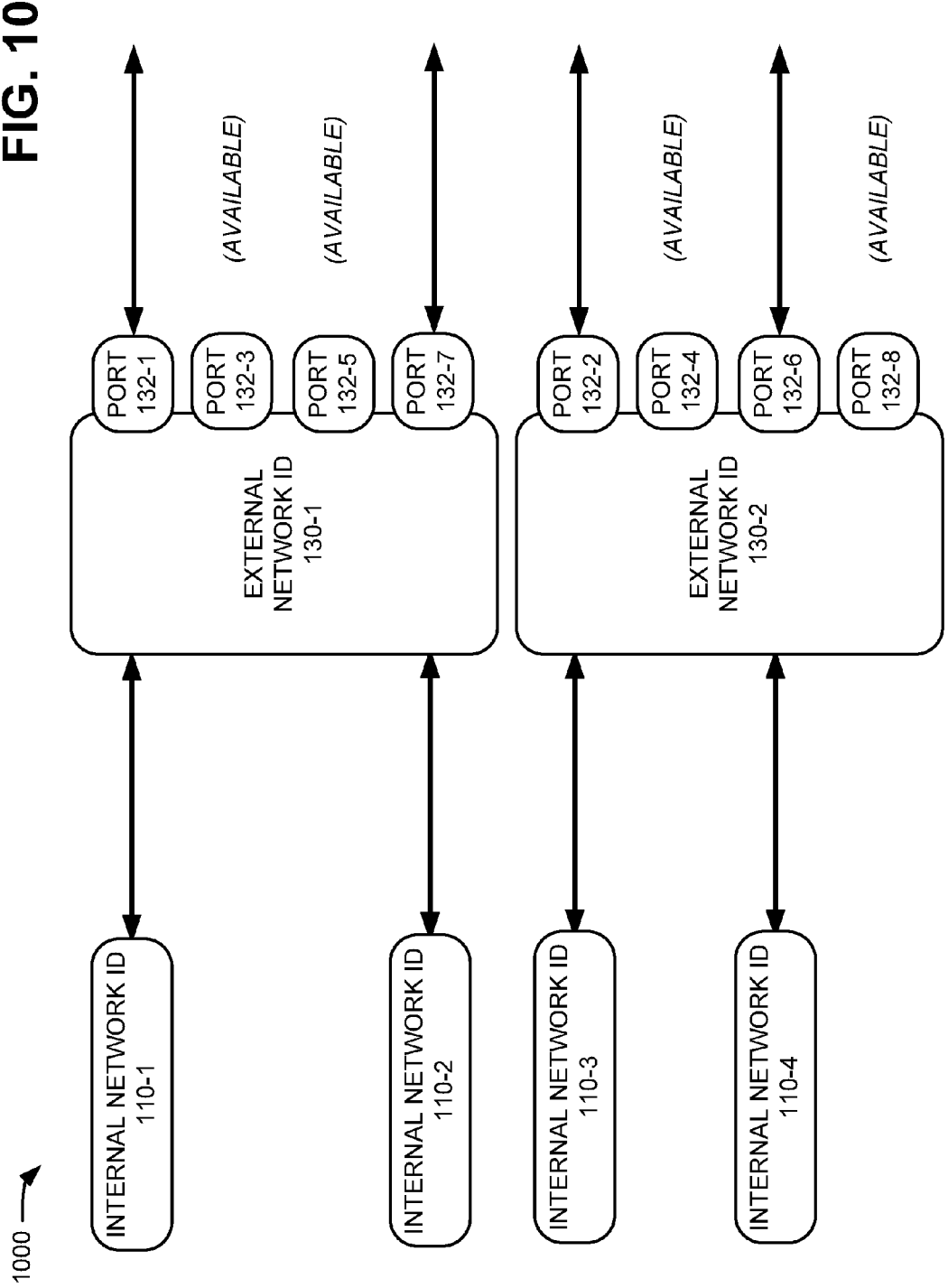

Referring to FIG. 10 resource allocation module 420 may enable network device 120 to pair an internal network ID 110 with an external network ID 130 based on a combination of conditions or criteria, including or excluding one or more of the conditions or criteria discussed above. In the example of FIG. 10, network device 120 may first attempt to select an external network ID 130 based on the quantity of connections associated with each external network ID 130; however, since both external network IDs 130 are currently associated with two connections, network device 120 may consider and additional criteria for selecting an external network ID 130. For example, if the additional criteria were a turn-based pairing solution, network device 120 may pair the next internal network ID 110 with external network ID 130-1.

Returning to FIG. 4, in addition to evaluating and selecting external network IDs 130 for pairing with internal network IDs 110, resource allocation module 420 may enable network device 120 to establish and monitor network connections. Additionally, or alternatively, resource allocation module 420 may maintain a map, a table, a list, or another data structure for tracking a status, a usage, a payload, and/or other characteristics regarding internal network IDs 110, external network IDs 130, ports 132 or network connections.

Connection management module 430 may provide functionality relating to establishing, maintaining, and terminating connections. For example, connection management module 430 may enable network device 120 to establish a connection requested by a local user device 210. In some implementations, the connection may be established using an external network ID that has been paired to an internal network ID corresponding to the local user device 110. Additionally, or alternatively, connection management module 430 may enable network device 120 to monitor a usage of the established connection and terminate the connection at an appropriate time (e.g., when user device 110 communicates a request to terminate the connection). Connection management module 430 may also, or alternatively, enable network device 120 to disassociate or otherwise end the pairing of external network ID 130 with internal network ID 110 so that external network ID 130 may be reused. In some implementations, there may be no direct correspondence of internal IDs to ports of an external ID, and it may be possible for multiple internal IDs to correspond to the same port.

Figure 11:
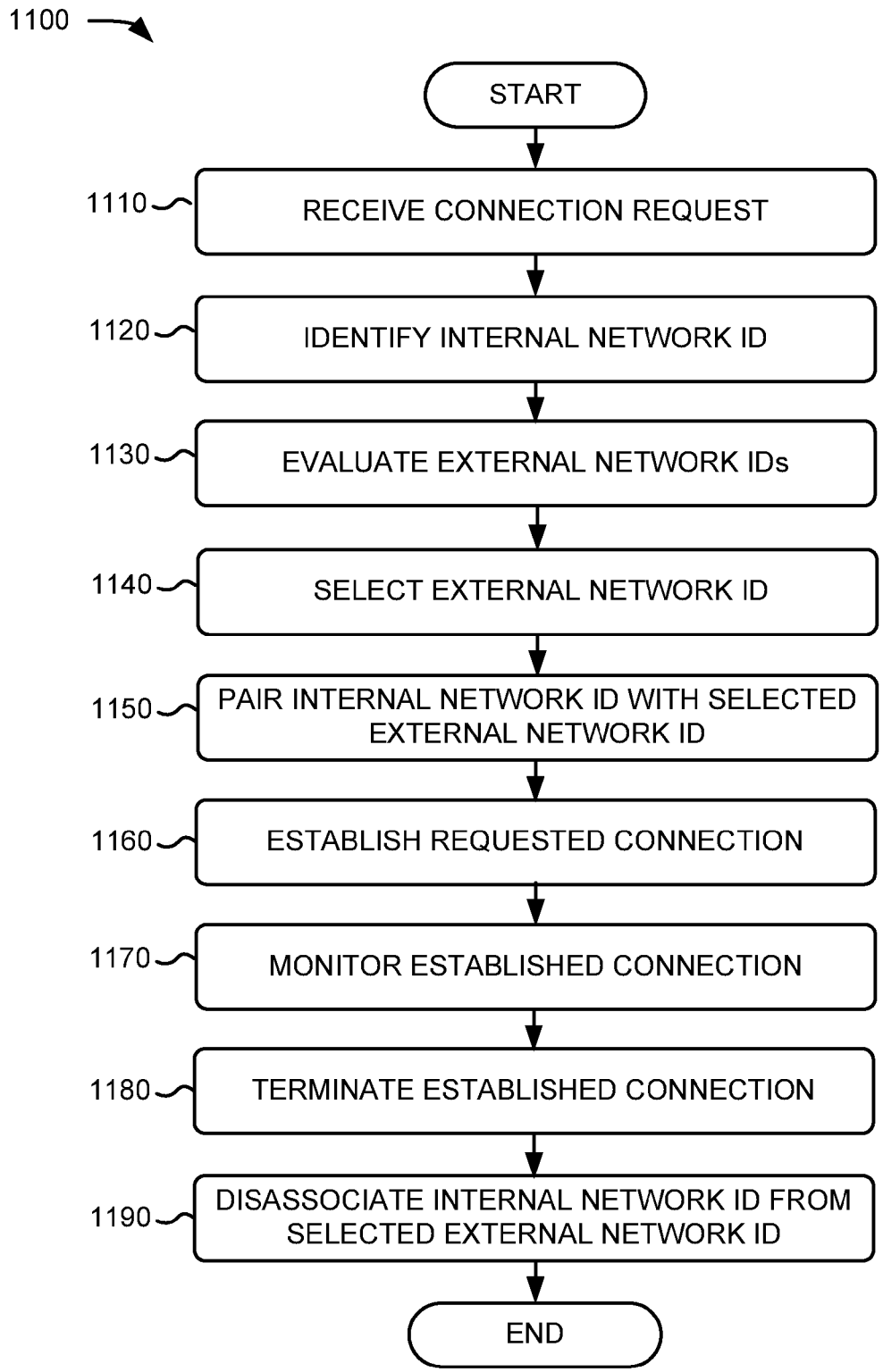
FIG. 11 is a diagram of a process for pairing network identifiers according to one or more implementations described herein.

FIG. 11 is a diagram of a process 1100 for pairing network IDs according to one or more implementations described herein. In one or more implementations, process 1100 may be performed by one or more components of network device 120. In some implementations, one or more blocks of process 1100 may be performed by one or more other components/devices, or a group of components/devices, including or excluding network device 120.

Process 1100 may include receiving a connection request (block 1110). For example, network device 120 may receive a message from a locally connected user device 210, and the message may include a request to establish a connection with a non-local device. In some implementations, a non-local device may include a device outside of an internal network 212 corresponding to user device 210. In some implementations, network device 120 may verify that a received connection request is not intended for another device (e.g., user device 110) that is locally connected to network device 120. However, in other implementations, network device 120 may process connection requests regardless of whether the connection requests are intended for a device (e.g., user device 110) that is locally connected to network device 120.

An internal network ID 110 may be identified (block 1120). For example, network device 120 may identify an internal network ID 110 in a message received from a locally connected user device 210. In some implementations, network device 120 may verify that the internal network ID 110 is not already associated with, or otherwise paired to, an external network ID 130.

External network IDs 130 may be evaluated (block 1130). For instance, network device 120 may evaluate one or more external network IDs 130 for pairing with the internal network ID 110. As discussed above in reference to FIGS. 4-10, network device 120 may evaluate external network IDs 130 based on one or more of a variety of conditions or criteria, or a combination thereof. Examples of such conditions or criteria include a turn-based criterion, a quantity of ports 132 available for each external network ID 130, a quantity of internal network IDs 110 associated with each external network ID 130, an estimated connection longevity associated with each external network ID 130, a measured or estimated payload corresponding to each external network ID 130, or other types of conditions or criteria relating to pairing internal network IDs 110 to external network IDs 130. In some implementations, network device 120 may evaluate external network IDs 130 by identifying an external network that is already mapped to, or paired with, internal network ID 110.

An external network ID 130 may be selected (block 1140). For example, network device 120 may select an external network ID 130 for pairing with an internal network ID 110. In some implementations, network device 120 may select the external network ID 130 based on an evaluation of external network IDs 130 as discussed above. In some implementations, if internal network ID 110 is already mapped to, or paired with, an external network ID 130, network device 110 may select the external network ID 130 that is already paired with internal network 110. In such implementations, process 1100 may not include one or more of the depicted operations, such as pairing internal network ID 110 to the selected external network ID 130 (block 1150) and/or disassociating internal network ID from the selected external network ID (block 1190) may not be executed. Additionally, or alternatively, in such implementations, if all of the ports associated with the selected external network ID are being used, an attempt to establish the requested connection (see, for example, block 1160) may fail.

An internal network ID 110 may be paired with an external network ID 130 (block 1150). For instance, network device 120 may map, associate, or otherwise pair internal network ID 110 to external network ID 130. In certain implementations, this may include generating and storing a data structure representing an association between internal network ID 110 and external network ID 130. In some implementations, the external network ID 130 may have been selected in response to an evaluation of external network IDs 130. In certain implementations, network device 120 may also, or alternatively, maintain a map, a table, a list, or another data structure for tracking a status, a usage, a payload, and/or other characteristics regarding internal network ID 110, external network ID 130, ports 132, or network connections.

A requested connection may be established (block 1160). For instance, network device 120 may establish a connection requested by user device 110. In some implementations, the connection may be established using external network ID 130 paired with internal network ID 110. Additionally, or alternatively, network device 120 may establish the requested network connection using external network ID 130 paired to internal network ID 110. For example, user device 210 may send information to external network 230 via network device 120. While the information is located within internal network 212, the information may be associated with an internal network ID 110. When the information passes through network device 120 to external network 230, the information may become associated with external network ID 130 based on the paring of internal network ID 110 to external network ID 130.

An established connection may be monitored (block 1170). For example, network device 120 may monitor a connection requested by, and established for, user device 110. In some implementations, network device 120 may monitor the connection for general usage statistics (e.g., is the connection being used, the amount of bandwidth being used, the content being transmitted, a duration of the connection, etc.). In certain implementations, network device 120 may also, or alternatively, monitor the connection for payload information, content type information, connection protocol information, and other types of information relating to the evaluation and/or selection of external network IDs 130, as discussed above.

An established connection may be terminated (block 1180). For instance, network device 120 may terminate a connection that was established using external network ID 130 paired to an internal network ID 110. Network device 120 may terminate a connection for a variety of reasons, such as a request, is received, from user device 210 to terminate the connection, a timeout event corresponding to the connection has occurred, or one or more of a variety of other reasons for terminating a network connection. In some implementations, terminating an established connection may include deleting a data structure, stored in a memory device, which represents an association between internal network ID 110 and external network ID 130.

Internal network ID 110 may be disassociated from external network ID 130 (block 1190). For example, network device 120 may disassociate external network ID 130 from internal network ID 110. In some implementations, network device 120 may disassociate external network ID 130 from internal network ID 110 in response to a connection corresponding thereto being terminated. In certain implementations, external network ID 130 disassociated from internal network ID 110 may be used to pair with the same or another internal network ID 110 to establish a requested connection. In some implementations, internal network ID 110 may not be disassociated from external network ID 130. For example, internal network ID 110 may not be disassociated from external network ID if another connection, corresponding to internal network ID 110 and external network ID, still exists.

While FIG. 11 shows a flowchart diagram of an example process 1100 for pairing network IDs, in other implementations, a process for pairing network IDs may included fewer operations, different operations, differently arranged operations, or additional operations than depicted in FIG. 11.

As described herein, network device 120 may be used to pair internal network IDs 110 with external network IDs 130 to effectively use network device 120 resources (e.g., to distribute the pairing of internal network IDs 110 with external network IDs 130 to maximize the quantity of ports available (e.g., potential connections) to each internal network ID 110). For example, network device 120 may receive a request from a local device (e.g., user device 110) to communicate with another device. Network device 120 may pair internal network ID 110 of the request with external network ID 130 based on one or more conditions or criteria, such as a turn-based criterion, a quantity of ports available to each external network ID 130, a quantity of internal network IDs 110 associated with each external network ID 130, an estimated connection longevity associated with each external network ID 130, a connection payload associated with each external network ID 130, or other types of conditions or criteria relating to pairing internal network IDs 110 to external network IDs 130. Network device 120 may establish the requested connection using external network ID 130 paired to internal network ID 110.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device, comprising:
 a memory to store instructions; and
 a processor, connected to the memory, to:
  receive a request from a local device to establish a connection with another device,
   the request comprising an internal network identifier of the local device;
  evaluate a plurality of external network identifiers, associated with the network device, based on selected criteria,
   when evaluating the plurality of external network identifiers, the processor is to:
    estimate a connection longevity corresponding to each of the plurality of external network identifiers, and
    identify a particular external network identifier, of the plurality of external network identifiers, with a lowest connection longevity out of the estimated connection longevity corresponding to each of the plurality of external network identifiers;
   select an external network identifier, of the plurality of external network identifiers, based on evaluating the plurality of external network identifiers evaluation; and
   establish the connection requested by the local device using the internal network identifier and the external network identifier.

2. The network device of claim 1, where, when evaluating the plurality of external network identifiers, the processor is further to:
 identify one of the plurality of external network identifiers using a turn-based selection solution,
  the turn-based selection solution comprising a selection scheme where external network identifiers are selected based on a sequence of external network identifiers.

3. The network device of claim 1, where, when evaluating the plurality of external network identifiers, the processor is further to:
 determine a quantity of available ports associated with each of the plurality of external network identifiers, and
 identify one of the plurality of external network identifiers associated with a greatest quantity of available ports out of the quantity of available ports associated with each of the plurality of external network identifiers.

4. The network device of claim 1, where, when evaluating the plurality of external network identifiers, the processor is further to:
 determine a quantity of internal network identifiers paired with each of the plurality of external network identifiers, and
 identify one of the plurality of external identifiers paired with a fewest quantity of internal network identifiers out of the quantity of internal network identifiers paired with each of the plurality of external network identifiers.

5. The network device of claim 1, where, when evaluating the plurality of external network identifiers, the processor is further to:
 identify a type of traffic corresponding to each of the plurality of external network identifiers, and
 estimate a connection payload for each of the plurality of external network identifiers based on the type of traffic corresponding to each of the plurality of external network identifiers.

6. The network device of claim 1, where, when evaluating the plurality of external network identifiers, the processor is further to:
 identify an external network identifier paired with the internal network identifier, and
 where, when selecting the external network identifier based on evaluating the plurality of external network identifiers, the processors is further to:
  select the external network identifier paired with the internal network identifier.

7. The network device of claim 1, where, when evaluating the plurality of external network identifiers, the processor is further to:
 track previously selected external network identifiers,
 access a pattern for selecting external network identifiers, and
 identify an external network identifier based on the previously selected external network identifiers and the pattern for selecting external network identifiers.

8. A non-transitory computer-readable medium storing instructions, the instructions comprising:
 a plurality of instructions which, when executed by one or more processors, cause the one or more processors to:

receive a first request from a first device to establish a connection with a second device,
the first request comprising an internal network identifier of the first device;
select a first external network identifier, of a plurality of external network identifiers, to maximize a quantity of potential connections available to the first device;
establish a connection between the first device and the second device using the internal network identifier of the first device and the first external network identifier;
monitor the connection between the first device and the second device for potential connection availability information;
receive a second request from a third device to establish a connection with a fourth device,
the second request comprising an internal network identifier of the third device;
select, based on the potential connection availability information corresponding to the connection between the first device and the second device, a second external network identifier to maximize a quantity of potential connections available to the third device; and
establish a connection between the third device and the fourth device using the internal network identifier of the third device and the second external network identifier.

9. The non-transitory computer-readable medium of claim 8, where the quantity of potential connections available to the first device comprises a quantity of available ports associated with the first external network identifier.

10. The non-transitory computer-readable medium of claim 8, where one or more instructions, of the plurality of instructions, to select the first external network identifier to maximize the quantity of potential connections available to the first device include one or more instructions to select the first external network identifier based on at least one of:
a turn-based selection solution,
the turn-based selection solution comprising a selection scheme where external network identifiers are selected based on a sequence of external network identifiers,
a quantity of available ports associated with each of the plurality of external network identifiers,
a quantity of internal network identifiers paired with each of the plurality of external network identifiers,
a connection longevity corresponding to each of the plurality of external network identifiers, or
a connection payload corresponding to each of the plurality of external network identifiers.

11. The non-transitory computer-readable medium of claim 8, where one or more instructions, of the plurality of instructions, to select the first external network identifier to maximize the quantity of potential connections available to the first device include one or more instructions to select the first external network identifier based on at least two of:
a turn-based selection solution,
the turn-based selection solution comprising a selection scheme where external network identifiers are selected based on a sequence of external network identifiers,
quantity of available ports associated with each of the plurality of external network identifiers,
quantity of internal network identifiers paired with each of the plurality of external network identifiers,
a connection longevity corresponding to each of the plurality of external network identifiers, or
a connection payload corresponding to each of the plurality of external network identifiers.

12. The non-transitory computer-readable medium of claim 8, the instructions further comprising:
one or more instructions to monitor the connection between the third device and the fourth device for potential connection availability information;
one or more instructions to receive a third request from a fifth device to establish a connection with a sixth device, the third request comprising an internal network identifier of the fifth device;
one or more instructions to select, based on the potential connection availability information corresponding to the connection between the third device and the fourth device, a third external network identifier to maximize a quantity of potential connections available to the fifth device; and
one or more instructions to establish a connection between the fifth device and the sixth device using the internal network identifier of the fifth device and the third external network identifier.

13. A method, comprising:
receiving, by a network device, a request from a first device to establish a connection with a second device,
the request comprising a network identifier of the first device;
evaluating, by the network device, external network identifiers based on selected criteria,
evaluating the external network identifiers based on the selected criteria comprising:
estimating a connection longevity corresponding to each of the external network identifiers, and
identifying a particular external network identifier, of the external network identifiers, with a lowest connection longevity out of the estimated connection longevity corresponding to each of the external network identifiers;
selecting, by the network device, an external network identifier, of the external network identifiers, based on evaluating the external network identifiers; and
establishing, by the network device, the connection using the internal network identifier and the external network identifier.

14. The method of claim 13, where evaluating the external network identifiers based on the selected criteria further comprises:
tracking previously selected external network identifiers,
accessing a preselected pattern for selecting external network identifiers, and
identifying an external network identifier based on the preselected pattern and the previously selected external network identifiers.

15. The method of claim 13, where evaluating the external network identifiers based on the selected criteria further comprises:
determining a quantity of available ports associated with each of the external network identifiers, and
identifying one of the external network identifiers associated with a greatest quantity of available ports of the quantity of available ports associated with each of the external network identifiers.

16. The method of claim 13, where evaluating the external network identifiers based on the selected criteria further comprises:

determining a quantity of internal network identifiers paired with each of the external network identifiers, and identifying one of the external network identifiers paired with a fewest of quantity internal network identifiers out of the quantity of internal network identifiers paired with each of the external network identifiers.

17. The method of claim 13, where evaluating the external network identifiers based on the selected criteria further comprises:

identifying a type of traffic corresponding to each of the external network identifiers, and estimating a connection payload for each of the plurality of external network identifiers based on the type of traffic corresponding to each of the external network identifiers.

18. The method of claim 13, where evaluating the external network identifiers based on the selected criteria further comprises at least two of:

identifying an external network identifier using a turn-based selection solution, the turn-based selection solution comprising a selection scheme where one or more external network identifiers are selected based on a sequence of external network identifiers, determining a quantity of available ports associated with each of the external network identifiers, determining a quantity of internal network identifiers paired with each of the external network identifiers, or estimating a connection payload corresponding to each of the external network identifiers.

19. The method of claim 13, where:

evaluating the external network identifiers based on the selected criteria further comprises identifying an external network identifier paired with the internal network identifier, and selecting the external network identifier comprises selecting the external network identifier paired with the internal network identifier.

* * * * *

UNITED STATES PATENT AND TRADEMARK OFFICE
CERTIFICATE OF CORRECTION

PATENT NO. : 8,806,033 B1  
APPLICATION NO. : 13/174457  
DATED : August 12, 2014  
INVENTOR(S) : Suresh Kumar Vinapamula Venkata et al.

Page 1 of 1

It is certified that error appears in the above-identified patent and that said Letters Patent is hereby corrected as shown below:

In the Claims:

Please correct claim 1 as follows:

Column 12, line 3, after "identifiers" delete "evaluation";

Please correct claim 11 as follows:

Column 13, line 64, before "quantity" insert --a--;

Column 13, line 66, before "quantity" insert --a--;

Please correct claim 17 as follows:

Column 15, line 12, after "each of the" delete "plurality of".

Signed and Sealed this  
Twenty-first Day of October, 2014

Michelle K. Lee  
*Deputy Director of the United States Patent and Trademark Office*